United States Patent
Long (10) Patent No.: US 6,168,814 B1
(45) Date of Patent: Jan. 2, 2001

(54) CONTINUOUS SHOCK WAVE FOOD PROCESSING WITH SHOCK WAVE REFLECTION

(75) Inventor: John B. Long, Sarasota, FL (US)

(73) Assignee: Hydrodyne Incorporated, Sarasota, FL (US)

( * ) Notice: Under 35 U.S.C. 154(b), the term of this patent shall be extended for 0 days.

(21) Appl. No.: 09/346,738

(22) Filed: Jul. 2, 1999

Related U.S. Application Data (60) Provisional application No. 60/115,610, filed on Jan. 12, 1999, provisional application No. 60/126,932, filed on Mar. 29, 1999, and provisional application No. 60/091,621, filed on Jul. 2, 1998.

(51) Int. Cl.$^7$ .................................................. A23L 3/32

(52) U.S. Cl. .................. 426/238; 99/451; 99/DIG. 12; 422/128; 452/141

(58) Field of Search ............................ 426/238; 99/451, 99/DIG. 12; 422/20, 128, 127; 452/141

(56) References Cited

U.S. PATENT DOCUMENTS

| | | |
|---|---|---|
| 3,492,688 | 6/1966 | Godfrey . |
| 3,594,115 | 7/1971 | Wesley et al. . |
| 3,711,896 | 1/1973 | Guberman et al. . |
| 4,458,153 | 7/1984 | Wesley . |
| 4,591,485 * | 5/1986 | Olsen et al. ............................ 422/20 |
| 5,026,484 | 6/1991 | Juvan . |
| 5,256,430 * | 10/1993 | Suzuki et al. ........................ 426/237 |
| 5,273,766 | 12/1993 | Long . |
| 5,328,403 | 7/1994 | Long . |
| 5,368,724 | 11/1994 | Ayers et al. . |
| 5,397,961 | 3/1995 | Ayers et al. . |
| 5,430,691 * | 7/1995 | Fridman .............................. 367/145 |
| 5,588,357 | 12/1996 | Tomikawa et al. . |
| 5,611,993 * | 3/1997 | Babaev ................................. 422/20 |
| 5,841,056 | 11/1998 | Long . |

FOREIGN PATENT DOCUMENTS

| | | |
|---|---|---|
| 0 516 080 | 12/1992 | (EP) . |
| WO 98/38875 | 9/1998 | (WO) . |
| WO 98/54975 | 12/1998 | (WO) . |

OTHER PUBLICATIONS

Donovan, Doug, "What a blast!"., Forbes Entrepreneurs. (Jul. 27, 1998).

Raloff, Janet, "Ka–Boom! A shockingly unconventional meat tenderizer.", Science News, vol. 153, pp. 366–267 (Jun. 6, 1998).

"Developments to Watch. Innovations.", Business Week (Oct. 20, 1997).

"Tender beef poised for a boom.", Financial Times (Oct. 30, 1997).

"Meat tenderizing could be a blast.", Industry Week (Dec. 17, 1997).

"Anti–gravity. Tender is the bite.", Scientific American (Jan. 1998).

(List continued on next page.)

Primary Examiner—Nina Bhat
(74) Attorney, Agent, or Firm—Browdy and Neimark (57) ABSTRACT

Water and meat pieces (P) are pumped through a conduit (100), the walls of which are made of plastic having an acoustic impedance close to that of water. The conduit is immersed in a tank (400) full of water. A shock wave generator 200 (chemical explosive or capacitor discharge electrodes) creates a shock wave in the water. The shock wave passes through the conduit without substantial reflection because the impedance of the conduit wall matches the impedance of the water. The shock wave tenderizes and at least partially sterilizes the meat. A heavy-duty shock-reflective cylinder reflects portions of the shock pulse onto the conduit. Continual explosions are repeated rapidly enough that all of the meat passing through is tenderized. Alternatively, the meat is packed in water within a closed container in place of the conduit.

28 Claims, 6 Drawing Sheets

OTHER PUBLICATIONS

Antosh, Nelson., "Company touts TNT tenderizing.", Houston Chronicle (Nov. 5, 1997).

"Tender meat closer.", Meat Processing (Jan. 1998).

Marriott, Norman., "Tenderize with shock waves.", Meat & Poultry (Dec. 1997).

Lee, Jill., "Hydrodyne." Agricultural Research (Jun. 1998).

"New meat tenderizing process.", Food Industry News (Jun. 1998).

Food Quality, vol. 5, No. 2 (Mar. 1998).

"Hydrodyne process promises tenderized meat faster—with greater food safety.", Meat Business (Jan. 1998).

Salvage, Bryan., "Hydrodyne process may be 'Off the Wall,' but it works.", Meat Marketing & Technology (Dec. 1997).

The National Provisioner (Jan. 1998).

* cited by examiner

CONTINUOUS SHOCK WAVE FOOD PROCESSING WITH SHOCK WAVE REFLECTION

CROSS REFERENCE TO RELATED APPLICATIONS

This application claims the benefit of three U.S. provisional patent applications, all by the present inventor: Ser. No. 60/115,610, "Continuous Treatment of Hamburger", filed Jan. 12, 1999; Ser. No. 60/126,932, "Improvements in Treating Meat by Explosive Discharge", filed Mar. 29, 1999; and Ser. No. 60/091,621, titled "Treatment of Meat", filed Jul. 2, 1998. The contents of all three of these applications are entirely incorporated by reference herein.

FIELD OF THE INVENTION

The present invention relates to the treatment of meat by shock waves to effect tenderization and/or the killing of microorganisms.

REVIEW OF THE RELATED TECHNOLOGY

Meat can be tenderized and at least partially sterilized by shock waves (acoustic or pressure pulses) from explosions caused typically by a chemical explosive charge or a capacitive discharge between two electrodes, such as shown in the U.S. Pat. Nos. 5,273,766 and 5,328,403 to John Long, and ending applications. A shock wave travels outward from the explosion site at the speed of sound (or somewhat higher in the case of high-intensity shock waves) and, like an audible sound echoing from a wall, will reflect from a shock-wave reflective surface.

The condition for reflection of a shock wave is that the speed of sound, which varies depending on the medium through which it travels, changes at an interface between two media. A pressure wave travels in water at about 1500 meters per second; the same wave travels in stainless steel at 5800 meters per second, nearly four times faster. This difference in the speed of sound is close to the difference in speed for shock waves, which are basically high pressure sound waves; they propagate by the same mechanism as sound does, but are sharp pulses and typically have a much higher sound intensity or pressure rise (sometimes called "overpressure") than most sounds.

When a sound or shock wave in water encounters a steel surface, most of the wave is reflected away from the surface because of the difference in speed (also referred to as an "acoustic impedance mis-match"), with only a small portion passing into the steel. In the aforementioned related technology, the reflection of shock waves from a thick steel surface was used to increase the intensity of the shock pulse. The pulse of the shock waves from an explosion is brief but has an appreciable length, and when the pulse is reflected from steel it passes through itself, increasing the shock wave pulse intensity. (The same effect is seen at a seawall, where ocean waves reflecting from the wall splash to a greater height up the wall than they reach in open water.)

In a preferred embodiment according to Long '766 and '403, the meat was placed in plastic bags which were lined along the bottom of a hemispherical steel shell, the shell was filled with water, and an explosion was set off in the geometrical center. The shock wave travelled outward to reach all the meat at roughly the same time and hit the meat with roughly the same overpressure or shock wave intensity, passing through the packaging film and meat twice due to the reflection from the steel shell. (The meat and the enclosing bags, having an acoustic or mechanical impedance close to that of water, do not appreciably reflect the shock pulse.)

This embodiment works very well in tenderizing and at least partly sterilizing the meat lined along and adjacent the inner wall of the shell, but it has some drawbacks. Importantly, this embodiment is inherently a batch operation, and the equipment is expensive. A stainless steel hemisphere four feet in diameter and two inches thick is not cheap, and the equipment needed for moving blast shields, water changers, and so on is complex and costly. Packing and removing the meat is slow, and further delays are mandated by safety concerns; workers should not load the hemisphere while the explosive is rigged, for example.

Another drawback is that the water is blown upwardly out of the hemispherical shell by the explosion and must be replenished. In the case of chemical explosives, it is preferable to drain off any remaining water and replace it with fresh water which is untainted by chemical by-products of the explosion, even through such water does not even come directly into contact with the meat. This draining and replenishing takes time and uses a great deal of water.

Also, the explosive force in the aforementioned embodiment is not balanced. The geyser of blast gases, steam, and spray out the top of the hemisphere causes a large reaction force which drives the hemisphere downwardly, and this must be resisted by large springs, dashpots, and so on, this additional equipment also being expensive. A special blast-shield dome above the shell as in Long U.S. Pat. No. 5,841,056 is needed to absorb the force of the geyser.

Placing meat into protective plastic bags can cause problems because any air bubble which remains in the bag along with the meat will act as an acoustic "lens", focusing the shock wave (this is similar to the converging-lens effect of a water droplet with light) onto the meat just on the other side of the bubble, causing a very high local pressure which can "burn" the meat. The heat so generated will often also burn a hole in the bag causing the plastic bag to rupture.

The placement of the meat against or in near adjacency to the surface of the shock-wave reflective steel is the root of some of the difficulties with previous embodiments as discussed above, and such placement has limitations which prevent any substantial improvement. The width of the layer of meat which can be tenderized is limited by the duration of the shock pulse, because if all the meat is to be subjected to intensity doubling then the thickness of the shock pulse must be at least twice the thickness of the meat, so that the pulse intensity will be doubled throughout the thickness of the meat. If the pulse is of very short duration, its trailing edge will have passed into the meat layer just as the leading edge is reflecting from the steel, and only the portion of meat closest to the steel will experience the doubled shock intensity; the rest will undergo two passes of the non-doubled shock wave. The width of the shock pulse in meters is roughly 1500 m/s divided by the pulse duration in seconds.

Limiting the thickness of meat means that the size of the hemisphere must be increased if each batch of meat to be treated is to be large enough that the overall processing rate is not too slow. But increasing the hemisphere diameter means that the shock pulse will be weaker, since the pressure intensity of a spherical wave falls off approximately as the cube of the radius (which corresponds to the distance from the source or sources of the explosion).

SUMMARY OF THE INVENTION

If the intensity doubling of the earlier embodiments were not insisted on, then the layer of meat could be spaced further away from the shock-wave reflective inner surface of the hemispherical shell, and the greater intensity of the shock wave would make up for the intensity doubling. If the meat were moved inwardly by about 29% of the hemisphere radius (precisely, 1.000 minus 0.707) then the single-pass shock wave intensity would be just as great as the doubled intensity at the inner surface of the hemisphere, even if the explosion energy were not increased. (The shock wave would pass outwardly through the meat and then, after reflection from the steel surface, pass back inwardly through the meat.) This shows that placing the meat directly against or closely adjacent a reflective surface is not essential.

However, the problem then arises as to how the meat can be supported against moving away from the explosion. The present invention employs a container for the meat which, unlike thick stainless steel, has as little reflectivity as possible so that the shock wave passes through it freely. The container can be made "acoustically transparent", i.e. with a mechanical or acoustical impedance approximately the same as water, so that a sound wave or a shock wave will pass through the container without being significantly diverted in direction or delayed in passage.

There are several ways to make a container acoustically transparent. One is make the container of wires, which sound (and a shock wave) can pass around, but a wire container will not in all cases adequately support the meat, and depending on the size of the wires or rods from which it is formed will interfere with the shock wave. A preferred way, though, is to make the container of a material having the same "acoustic impedance" as the liquid in which it is immersed. If the impedances of the container material and the liquid are about the same, then the shock wave will have the about the same speed in both materials. According to Huygens' principle, the waves then will not be bent by refraction. Neither will they reflect from the interface between the liquid and container material.

(An analogy can be made to light waves. If a solid object immersed in water has an "index of refraction" (optical impedance) close to that of the water, it will be nearly invisible because the light rays passing through it will not bend. For example, a piece of clear ice or glass is less visible in water than in air, because there is little difference between the indices of refraction.)

If the liquid is water as is preferred, the container may be made of a material in which the speed of sound is similar. Such materials are available. In gum rubber, for example, the speed of sound is only 3% higher than in water, and several more durable plastics are close enough in their acoustic impedances to water that they are quite suitable for the meat container. One suitable and well-known material, which is approved for use with food, is TYGON, which is a plasticized vinyl polymer; others are polyethylene and polypropylene. Other plastics can be routinely tested for acoustic transparency and durability in the explosive environment. If a hemispherical meat container made of TYGON or the like were suspended concentrically inside the hemispherical shell, the meat could be tenderized without the need for reflection, as discussed above.

But this would not eliminate the problems with the earlier embodiments, namely the need for batch processing and the associated slowness and complex equipment. In order to attain either continuous processing, semi-continuous or intermittent processing, or improved batch processing, the present invention exchanges the earlier hemispherical geometry for an essentially cylindrical geometry, while in some embodiments the batch container is exchanged for a conduit (e.g. a TYGON tube) through which the meat product is pumped or carried in the case of hamburger or the like (i.e. a slurry) or by flowing water in the case of pieces of meat, e.g. de-boned chicken parts or plastic film wrapped beef. The advantages of a solid pipe of suitable-impedance plastic, substantially transparent to the shock wave, as compared to a conduit made of fine mesh, are evident in relation to food transport; such a tube is also more "transparent" to shock waves than is a mesh or framework. TYGON, and other suitable plastics, are available in the form of tubing.

In place of the steel hemisphere of prior embodiments, the present invention preferably provides a roughly hollow cylindrical shock reflector surrounding the plastic conduit or static meat holder and the explosion site or sites, so that the shock waves are internally reflected. Even if the geometry is not so precise that shock wave reflections are perfectly arrayed, the reflector serves as a reverberant chamber in which the many shock wave echoes produce a quasi-hydrostatic pressure pulse.

As the meat is pumped through the plastic conduit in the case of such a continuous system, explosions are set off near the conduit repeatedly, at short enough intervals so that all of the meat passing through the conduit is exposed to shock wave treatment. All reflections of shock waves are preferably from surfaces at a distance from the plastic conduit and the meat.

The meat in such a continuous process is preferably subjected to a plurality of shock wave passages in short succession, which create the quasi-hydrostatic pressure wave effect of overlapping pulses, either through overlapping of the shock waves and a consequent increase of the shock intensity, or by failure of the meat or bacteria therein to "recover" from one shock before the next shock quickly arrives. The shock waves may impinge on the meat either directly, by reflection, or after plural reflections from a number of surface areas of the reverberant cylindrical chamber.

The provisional applications by the present inventor disclose multiple-explosion arrangements which use a number of charges or electrodes. The multi-explosion arrangement has many advantages, including nullified recoil by canceling of explosive impulses, and ready adaptation to continuous processing. The use of several explosions creates the need for precise timing of the explosions if their shock waves are to hit the plastic conduit and pass through the meat simultaneously. Timing is especially important to achieve the desired quasi-hydrostatic pressure tenderization. If the charges or electrodes are at the same distance from the conduit, the timing requirement is that the explosions be precisely synchronized.

The problem inherent in achieving high precision in timing the explosions when there are plural sources of explosion can be avoided by the use of a single explosion from which the shock wave converges on the conduit due to reflection (or refraction) of the shock wave. In this case the only timing requirement is the very coarse requirement that the explosions be frequent enough and regular enough that all of the meat passing through the plastic conduit is exposed to the shock waves.

From a single explosion a spherical shock wave expands rapidly and uniformly until it encounters a change in acoustic impedance and is reflected or refracted. With a proper arrangement of reflective surfaces the expanding spherical shock wave from the single explosion can be diverted and reflected so that the reflections impinge on the meat in the conduit from several directions in a short time.

If the "rays" (portions of the wave front travelling perpendicular to the wave front surface) all travel the same distance to reach the conduit, then the waves will impinge on the meat inside the conduit simultaneously.

The present invention greatly speeds the processing of meat (or other products) by moving the shock-wave reflective surfaces further away from the meat and positioning and supporting the meat with the use of an acoustically transparent conduit, and by providing the shock-wave reflective surface in the form of a cylinder or its equivalent. The present invention thus meets a main object of providing improved treatment, and it also meet the object of overcoming other deficiencies in the earlier embodiments noted above.

BRIEF DESCRIPTION OF THE DRAWINGS

The above and other objects and the nature and advantages of the present invention will become more apparent from the following detailed description of embodiments taken in conjunction with drawings, wherein:

FIG. 5b is an elevational view of the arrangement of FIG. 5a;

FIG. 6b is an elevational view of the arrangement of FIG. 6a.

DETAILED DESCRIPTION OF THE PREFERRED EMBODIMENT

Here, and in the following claims:

"shock wave", "acoustic pulse", "pressure spike", and similar terms, are used generally interchangeably. All describe an acoustic wave or pressure wave travelling at (or above) the speed of sound. The terms such as "shock wave", also encompass high-energy square waves, sinusoidal waves, and the like generated by loudspeakers and underwater sirens. A sound having a frequency is merely a repetition of shock waves, and by Fourier's theorem a shock wave is composed of frequencies. The present invention contemplates treatment of food products by high-intensity sounds, whether in discrete pulses or not; and "conic section" has the usual mathematical definition: circles, ellipses, parabolas, and so on.

Figure 1:
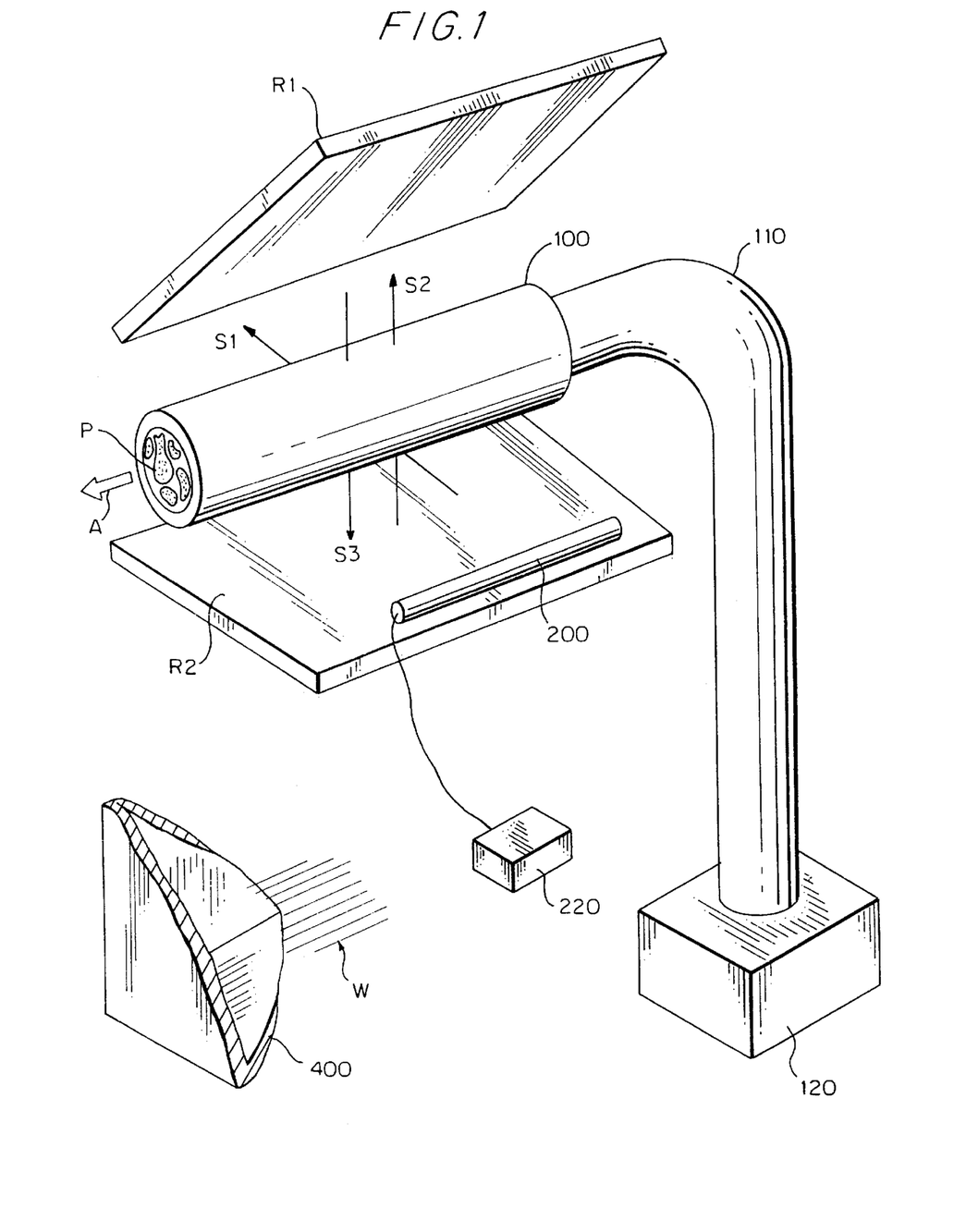
FIG. 1 is a partially schematic perspective view of the invention.

FIG. 1 shows the invention in schematic and theoretical overview. A food product P, which might be for example deboned chicken parts in water as illustrated, or instead a semi-solid cylinder of hamburger, i.e. a meat slurry, moves through a plastic or other acoustically transparent conduit 100 in the direction of large arrow A, propelled by a mixer/pump 120 coupled to a feed pipe 110. Water W, contained in a surrounding tank 400, surrounds the conduit 100; for clarity, only a corner of the tank 400 is depicted. The sectioned end of the conduit 100 is coupled to another pipe (not shown) or other means to deliver the food product P from the tank 400 for further processing.

As indicated above, the conduit 100 is preferably made of a plastic or other material acoustically impedance-matched to water, the preferred liquid. Inside the conduit 100 the food product, or mixture of food pieces and water, is itself largely composed of water. Therefore the region of the conduit 100 consists of either water or substances which are acoustically similar to water and therefore this region is substantially acoustically homogeneous. Shock waves or sounds can pass across it with no great deflection or reflection.

Adjacent the conduit 100 is a wave generator, preferably an explosive device 200. It may be a chemical explosive, e.g. in strip form, a set of spark electrodes, or a mechanical device which produces a shock wave or a sound of sufficient comparable energy (e.g. a siren). The explosive device 200 is coupled to a detonation circuit or capacitive discharge release circuit 220 which controls the timing of the explosion and also provides energy for the explosion in the case of electric-discharge or electromechanical wave generation (e.g. it includes capacitors).

Upon detonation or discharge a shock wave expands outwardly. One portion of the shock wave passes directly through the conduit 100 as indicated by arrow S1. Other portions of the shock wave, labeled S2 and S3, are reflected from the shock-waves reflection surface, here represented by baffles or reflectors R1 and R2, which in theory might be for example heavy spring-mounted steel plates, and pass through the conduit 100 as indicated by the corresponding arrows. It is to be understood, however, that this figure does not show an important feature of the present invention, namely the shock-reflective chamber having a conic section which eliminates the need for springs or the like.

It will be seen that the passage of the shock waves S1, S2, and S3 can be made generally simultaneous by properly positioning the reflectors R1 and R2. Alternatively, two shock wave generators 200 may be placed symmetrically on either side of the conduit 100 (not shown in FIG. 1); this arrangement also will provide for balanced impulses onto the conduit 100 when the two generators 200 are both exploded simultaneously. Also, there could be three wave generators spaced 120° apart, and so on.

Instead of water, any liquid (or even gas) may be used to transmit the shock waves through the tank 400 and/or to transport the food product P, in particular an aqueous mixture of water and such substances as salts, pH adjusting substances, disinfectants, surfactants, etc., can be used. In this case the acoustic impedance of the conduit 100 may be adjusted accordingly by appropriate selection of the material from which the conduit is made.

It is noted that the liquid in the tank 400 may be different from the liquid in the conduit 100. These two liquids may have somewhat different acoustic impedances, but these are preferably as close as possible. If the acoustic impedances of the conduit 100, the first liquid, and the second liquid are all generally similar, then shock waves passing over the conduit will not be substantively diverted (reflected or refracted) and the meat P inside the conduit 100 will be treated as desired.

In its broadest but not preferred form, the invention contemplates dropping food pieces or extruding food vertically through water without the use of a distinct conduit. In such an arrangement the explosive device 200 and cylindrical reflector would be deployed about a vertical axis instead of the conduit 100, i.e. the conduit would be absent. However, such an embodiment requires careful and difficult balancing of the shock waves in opposing directions to prevent the meat pieces from being blown apart.

Figure 2:
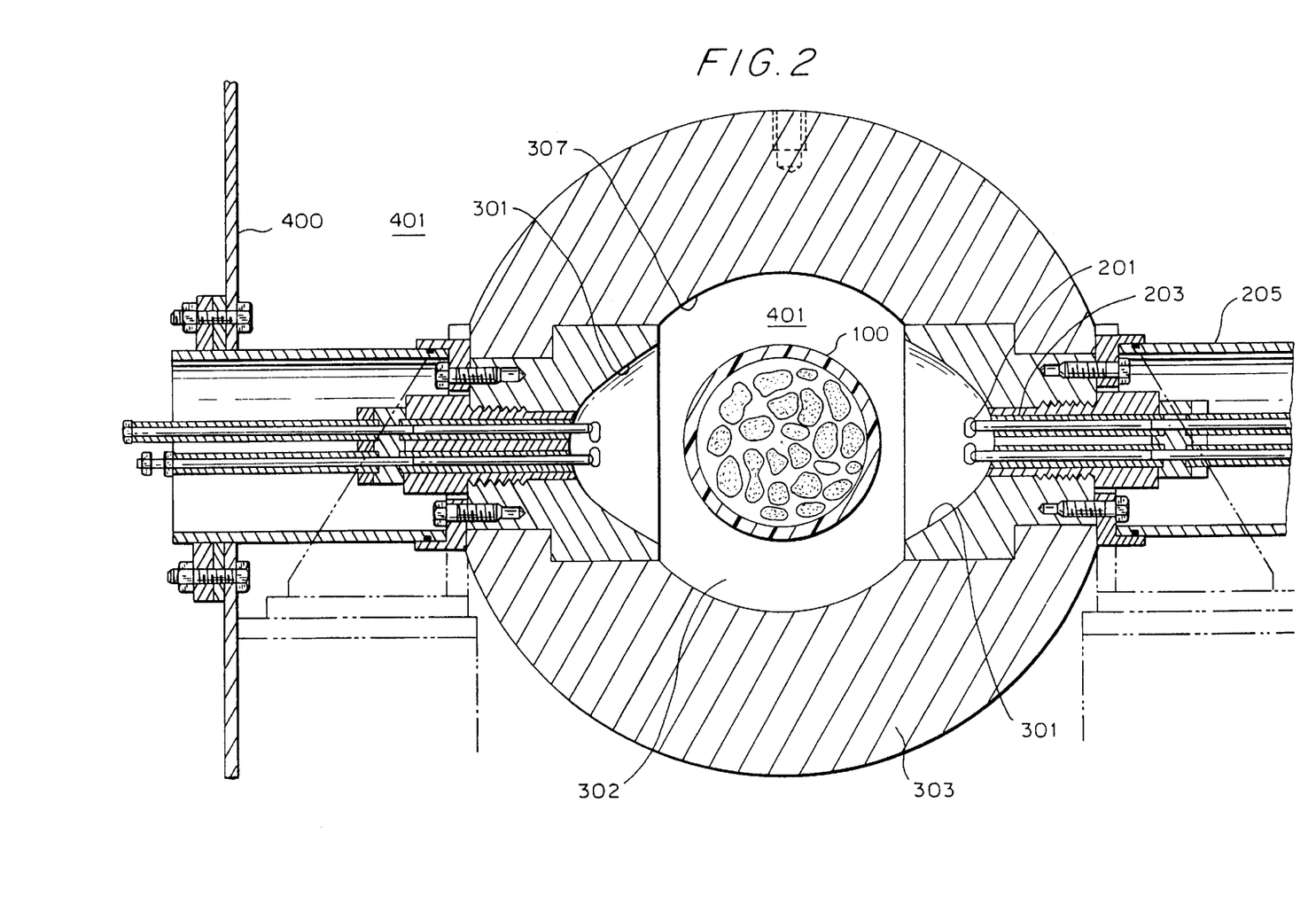
FIG. 2 is a cross-sectional view, taken perpendicular to a conduit axis, of a first embodiment.

FIG. 2 is a cross section of a first preferred embodiment taken on a plane perpendicular to the axis of the tubular plastic conduit 100, which is filled with pieces of food (e.g. chicken pieces, plastic film wrapped beef, or hamburger) and liquid flowing in a direction into or out of the plane of the paper. The conduit 100 is immersed in the liquid 401 filling the tank 400, and this liquid 401 also fills the annular space 302 of the cylinder 303 appearing in the cross section of FIG. 2 as a generally football-shaped opening. The cylinder 303 includes a generally concentric cylindrical inner surface 307 of a heavy chamber wall, and two paraboloidal surfaces 301.

The explosive device in this embodiment includes two pair of electrodes 201, each of the four electrodes having a respective insulating sheath 203, each pair coupled to a capacitive discharge device (not shown in FIG. 2) such as disclosed in WO 98/54975 and a corresponding U.S. patent application. The electrical parts exclusive of the electrodes are kept dry by a watertight shield 205.

The spark gap of each pair of electrodes 201 is geometrically centered on the focus of the surrounding parabolic reflecting surface 301. The two parabolic reflecting surfaces (paraboloids of revolution) share a common axis, shown by a dash-dot line.

When a discharge takes place through either pair of electrodes, the sudden release of energy creates a shock wave followed by a gas bubble. The major portion of the shock wave (in terms of spherical angle) reflects off the parabolic surface, creating a plane shock wave which proceeds from the shock generator directly across the cylindrical chamber, through the conduit 100 and the meat therewithin, and onto the opposite parabolic reflector, which reflects the shock wave, for the second time, onto the other pair of electrodes. The converging shock wave may create a secondary local pressure rise from which the wave may again radiate causing some back-and-forth reverberation.

Other portions of the shock wave will bounce off the cylindrical surface 307, and the meat, water and conduit 100 will to some extent refract the shock wave. As a result of the multiple reflections and refractions, the shock wave will reverberate inside the cavity, causing a quasi-hydrostatic pressure rise. Both pairs of electrodes 201 are desirably discharged simultaneously, doubling the energy imparted to the food product and preventing any net imbalance of force on the conduit from the shock wave or subsequent gas bubble.

The cylindrical surface 307 is preferably approximately as long as its diameter and the ends of the explosion containment cylinder 303 (bounded by the cylindrical surface 307) are preferably open to permit water to be blown out of the ends by the force of the gas bubble created by the explosion (i.e. the water moves into and out of the plane of the paper). The explosion is radially contained by the strong cylinder walls, which are preferably made of stainless steel. Because of the cylindrical symmetry, the impulse imparted to the meat is balanced, and there is no net force tending to blow the meat, or the conduit, away from its central location as long as the explosions are simultaneous and of equal energy. If only one of the shock generators creates a shock wave, then there may be a sideways force on the conduit 100, depending on the hydrodynamics after the explosion, and especially the gas bubble which quickly follows the shock wave.

After the explosion, water 401 within the tank 400 will immediately flow back to fill the cavity 302 surrounding the conduit 100, in time for the next explosion that will treat the meat yet to arrive at the shock wave zone between the parabolic reflectors. The continuously moving food product is treated continuously by the continual repeated explosions at the electrodes creating shock waves inside the reverberant cavity.

Alternative embodiments to that of FIG. 2 (not shown) include various placements of the electrodes and their parabolic reflectors. Instead of the two diametrically opposed shock generators spaced 180° apart shown in FIG. 2, three shock generators spaced 120° apart can be used, four spaced 90° apart, and so on. The shock generators can also be staggered along the axis in sets, and so on. The axially spaced explosions may be simultaneous or sequential.

Figure 3A:
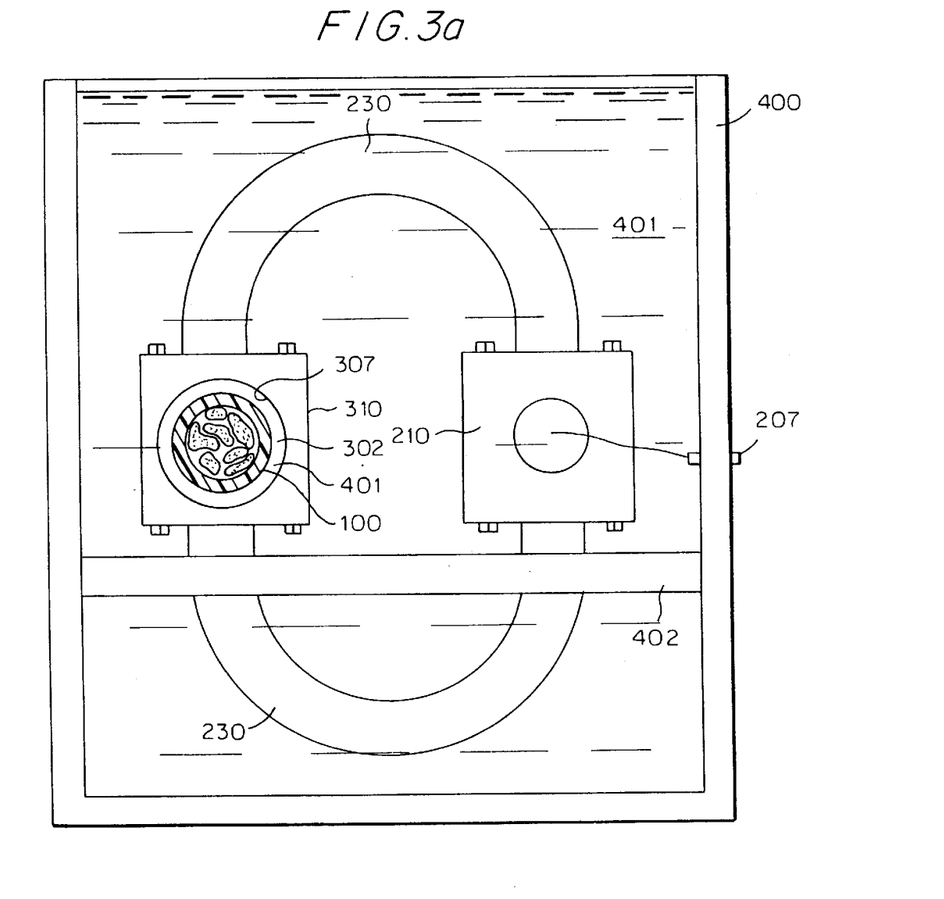
FIGS. 3a and 3b are an elevational and schematic view of a second embodiment.
Figure 3B:
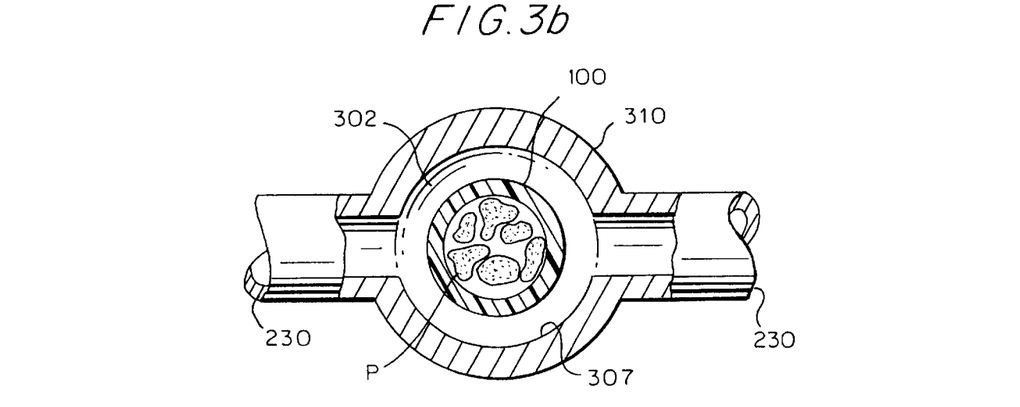

FIG. 3*a* shows a second embodiment in which only one shock generator is used but in which the shock waves hit the conduit from opposite directions, creating a balanced force and a quasi-hydrostatic pressure rise. Mounted inside the tank 400 are an explosion chamber 210, a treatment chamber 310, and a toroidal pipe 230 supported on a cross member 402. As in FIG. 2, the conduit 100 is perpendicular to the plane of the paper. The ends of both halves of the toroidal pipe 230 are coupled into both the explosion chamber 210 and the treatment chamber 310, so that the water inside can flow clockwise or counterclockwise as seen in FIG. 3*a*. The schematic cut-away FIG. 3*b* shows how the sections of the toroidal pipe 230 connect with the treatment chamber 310.

A discharge wire 207 is seen passing from outside to the explosion chamber 210 in FIG. 3*a*. An explosion inside the explosion chamber 210 creates shock waves which travel along the inside of the toroidal pipe, bouncing off the reflective curved surfaces of the pipe 230 as they progress, and reaching the treatment chamber simultaneously because of the equal lengths of the two sections of the toroidal pipe coupling the explosion chamber 210 to the treatment chamber 310.

The balanced shock wave impact from opposite sides prevents sideways force on the shock-wave transparent and meat containing conduit 100, and the use of a single shock generator obviates the need for synchronizing two or more shock generators at any single axial location.

The present invention includes the use of more than two pipes to convey shock pulses in balanced fashion to the treatment chamber 310. Any number greater than two can be used, and if of equal length can be of any shape.

Figure 4:
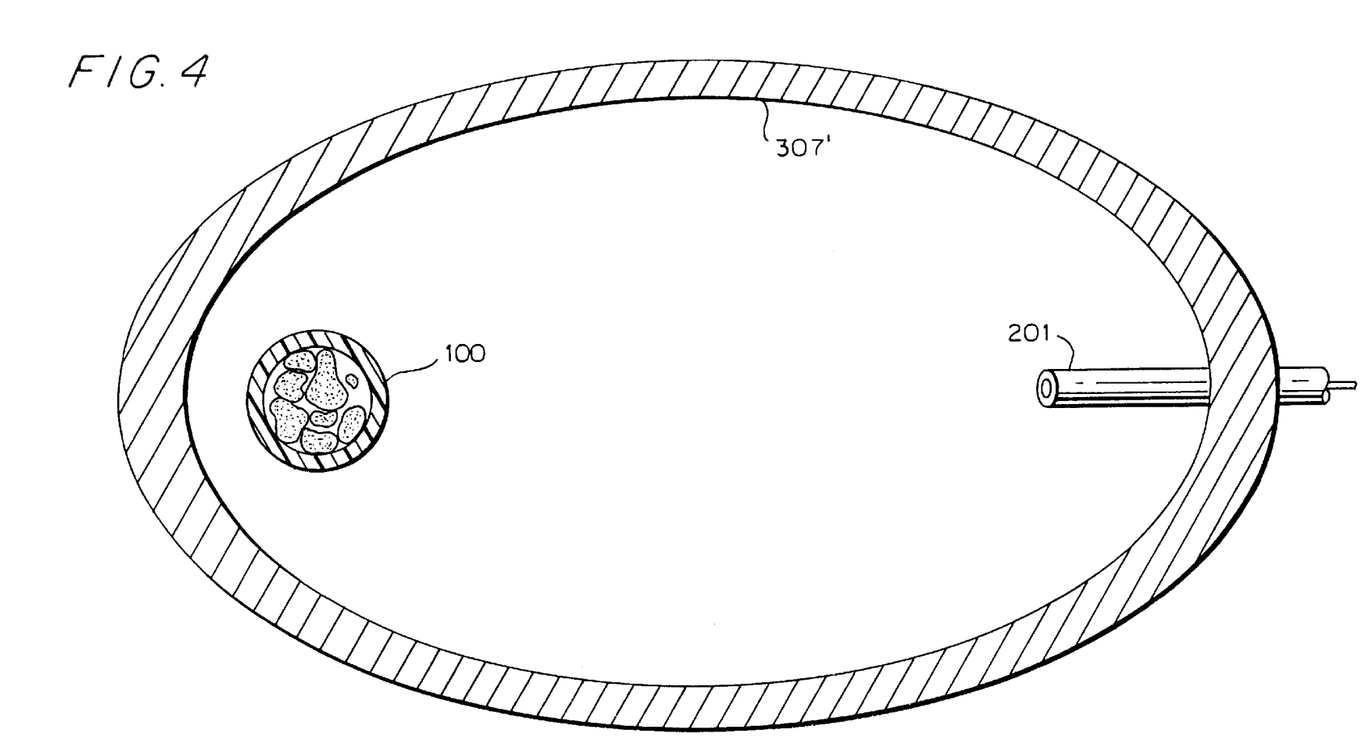
FIG. 4 is a schematic view of a third embodiment.

FIG. 4 depicts a third embodiment of the present invention. Here the cylindrical surface 307 of FIG. 2 is flattened into a chamber having a surface 307' with an elliptical cross section. At one focus of the ellipse is the electrode pair 201 and centered at the other focus is the meat containing conduit 100. A geometrical property of the ellipse is that rays from one focus, internally reflected from the inner wall of the elliptical chamber 307', converge at the other focus. Because of this property, the shock wave from the electrode 201 will converge onto conduit 100 from all sides and impinge at all points on the conduit surface simultaneously, except that the shock wave coming directly from the electrode 201 will pass through the conduit 100 before the arrival of the rest of the shock front, bounce off the far wall, and then hit the conduit again at the same time as the rest of the shock front reaches the outside of the conduit.

If the explosion comes from a point, as from a pair of electrodes like those of FIG. 2, then the shock wave will not converge precisely on the center of the conduit, except directly opposite the explosion. The convergence at other locations along the conduit will not be precisely centered. If the shock wave comes from a line explosion (e.g., a strip of explosive in the same position as the electrode of FIG. 4) the shock wave will impinge on the conduit 100 simultaneously and uniformly along its length corresponding to the length of the strip explosive.

The same convergence of shock waves onto the conduit which is exhibited by the elliptical shape of FIG. 4 can be achieved with refractive acoustic lenses. Such a lens (not shown) can be made by immersing in the tank 400 a hollow air-filled shell shaped like an optical converging lens. In the case of a conduit or container made at least partially of materials less than perfectly impedance-matched to the surrounding liquid, the conduit or container wall (or some portion of it) can act as a lens to control the convergence and/or divergence of the waves in the liquid inside and outside the container/conduit.

Figure 5A:
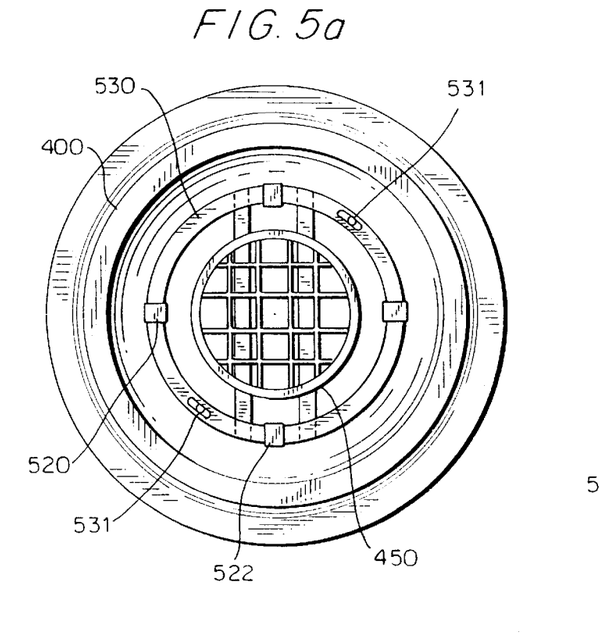
FIG. 5a is a plan view of a cylindrical reflector inside a cylindrical-hemispherical tank.
Figure 5B:
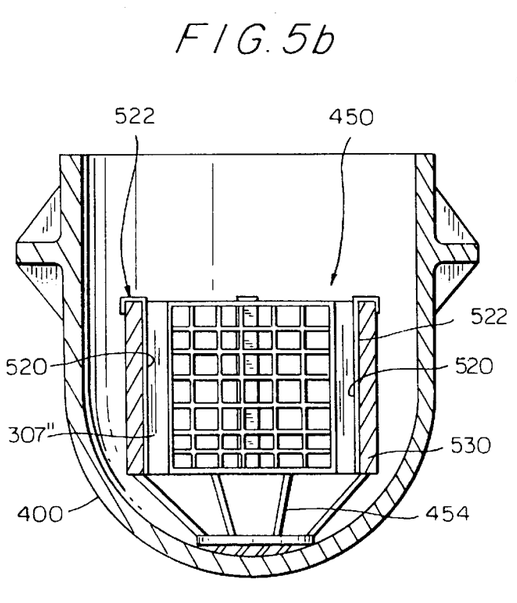
Figure 5C:
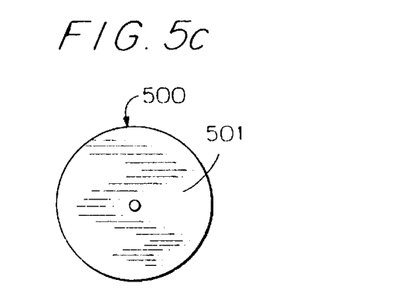
FIG. 5c is a plan view of a meat container inside the cylindrical reflector.
Figure 5D:
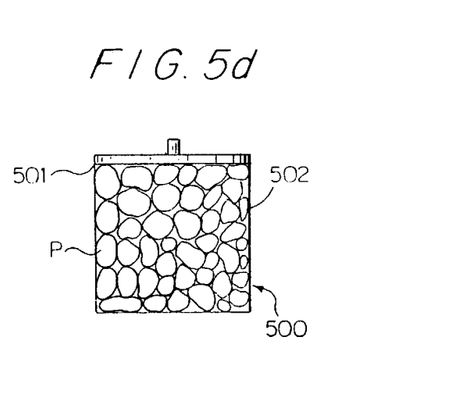
FIG. 5d is an elevational view of the container of FIG. 5c.
Figure 5E:
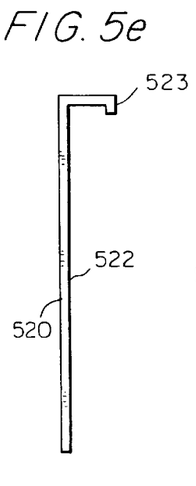
FIG. 5e is an side view of an explosive strip.
Figure 5F:
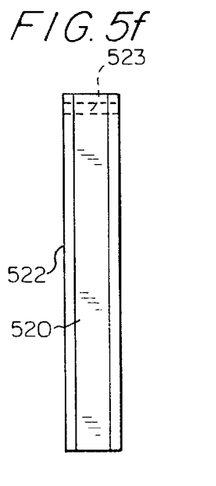
FIG. 5f is a frontal view of an explosive strip.
Figure 6A:
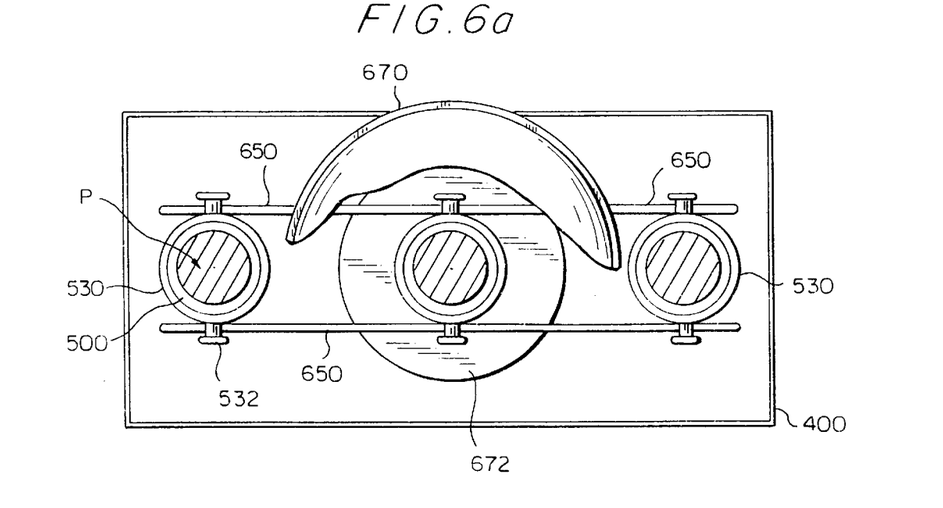
FIG. 6a is a plan view of tank with moving cylindrical reflectors.
Figure 6B:
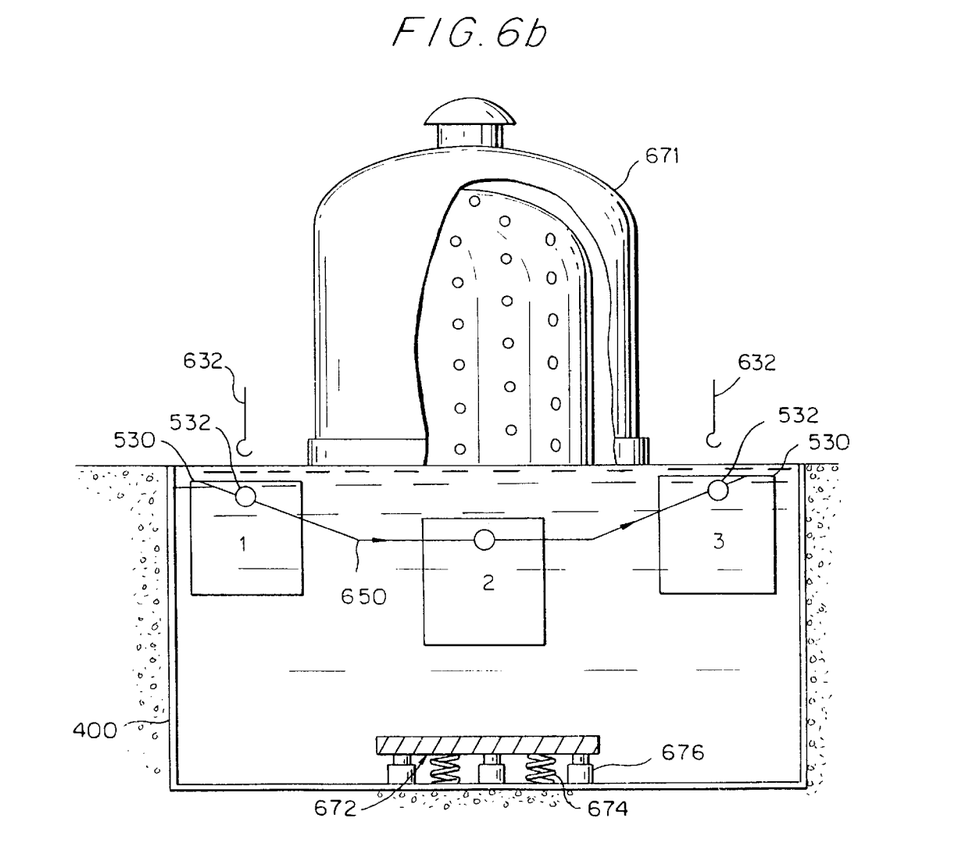

Two further alternative and preferred embodiments are schematically illustrated in FIGS. 5a–5f and 6a–6b. FIGS. 5a–5f illustrate a static or batch system and FIGS. 6a and 6b illustrate a continuous or semi-continuous (intermittent) system involving a conveyor. Both embodiments as illustrated use chemical explosive strips 520 placed against the inside wall of a shock-wave reflective steel cylinder 530 with an inner cylindrical surface 307" acting as a reflector. Both systems can also be adapted to use electrical discharge explosion in place of the explosive strip 520 (not shown in FIGS. 5a–5f).

The explosive strips 520 are preferably adhered to metal straps 522 having upper hooks 523 which hook over the upper edge of the shock-wave reflective cylinder 530. The chemical explosive strips 520 preferably used in the illustrated embodiment have a sticky backing. This explosive is commercially available in sheets and can be cut into strips which are then placed on the metal straps 522 that hang from the upper edge of the cylinder 530. The straps 522 can be installed in a matter of seconds along the interior of the cylinder. The strips 522 survive the explosion and can be used repeatedly.

A preferred embodiment of the cylinder 530 is open-ended, made of stainless steel, with a wall 2 inches (5 cm) thick, 26 inches (66 cm) long on the axis and with an inside diameter of 52 inches (132 cm). Lifting eyes 531 may be provided along the upper edge of the cylinder 530.

In the embodiment illustrated in FIGS. 5a–5f, the meat is placed in a cylindrical container 500 (shown in FIGS. 5c and 5d) having a body 502 and a tight lid 501 held in place thereon, such as by frictional forces or retaining means of various types, and preferably the container 500 is made of plastic material, e.g. TYGON, having an acoustic impedance close to that of water. The container 500 thus corresponds to the conduit 100 of the earlier described embodiments. The lid 501 preferably has a check or burp valve to permit escape of liquid when the container 500 is squeezed by the gas bubble. The diameter of the container 500 is preferably smaller than the radius of the open-ended stainless steel cylinder 530 by about 8 inches (20 cm), resulting in a four-inch (10 cm) annulus between the container 500 and the reflective cylinder wall 307" of the cylinder 530. In experiments conducted, the container 500 was a commercially available RUBBERMAID garbage can formed of plasticized vinyl plastic.

FIGS. 5a and 5b show an optional basket 450, which may be made of quarter-inch (0.6 cm diameter) stainless steel rod with openings about 4 inches (10 cm) square. In an embodiment which is not preferred, the basket 450 may be used to support and retain the plastic container 500, and may itself be supported on a support 454. In yet another embodiment, the container 500 may be eliminated and the meat packed directly in the basket 450, but this also is not preferred for reasons given above.

The entire assembly, submerged in water within the tank 400, may rest on the tank bottom which may have a generally hemispherical shape as shown in FIG. 5b, although the shape of the tank 400 is irrelevant. The container 500, and/or the basket 450 and support 454, can be placed into the hemispherical tank or other water containing structure by a crane (not shown). Other types of supports can be used in place of the support 454.

In FIG. 5b, the cylinder 530 is spaced about 12 inches (30 cm) from the hemispherical bottom of the tank 400. This space is sufficiently large to permit the gas bubble to vent without moving the cylinder 530.

As indicated above, it is preferred to use a closed container alone with a suitable support to hold it in position, without the open basket 450. Such a container 500, as discussed above, is preferably a water-tight container formed of a material which is an acoustic match with water, e.g. plasticized vinyl plastic, filled with meat and then filled with the inert or meat-treating liquid, e.g. water or water containing additives.

The strip chemical explosive 520 is placed at 90° locations around and along the inner wall 307" of the cylinder 530 as best shown in FIG. 5a. and extends the height (length) of the cylinder. However, the length, thickness, width and positioning of the explosive strips can be varied. It has been found that when the explosive is detonated at a distance as close as four inches from the bagged meat packed within the container 500, neither burn nor rupture of the bag around the meat occurs. The result on some tougher cuts of meat subjected to this treatment has been a 50% improvement in tenderization over the use of earlier embodiments in which the meat is placed against or closely adjacent the hemispherical wall of the tank 400.

The present invention and especially the embodiments of FIGS. 5a–5f and 6a–6b have a number of advantages as compared to the previous methods and apparatus.

(1) All of the energy of the explosion is directed inwardly toward the meat so that substantially all of the energy of the explosion acts on the meat to effect its tenderization and/or destruction of microorganisms on or in the meat. In the absence of the cylinder 530, 303, 310, e.g. in the use of the hemispherical tank 400 with the explosive discharge occurring at the focus of the hemisphere, half of the energy is directed upwardly causing displacement of water from the tank, whereas only the other half is directed downwardly and outwardly toward the meat. With the strip explosive, for example, the energy from the explosive which would otherwise be directed radially outwardly is reflected back inwardly by the cylinder wall in the same direction as the remainder of the explosive discharge. Theoretically, half as much strip explosive should be needed, compared to the amount used when the meat is placed along or adjacent to the hemisphere and the explosive discharge is carried out at the focal point as per prior embodiments.

(2) Packing the meat in a cylindrical shape within the container 500 of the embodiments of FIGS. 5a–5f and 6a–6b simplifies handling of the meat and fabrication of the container, either in open basket form or from a material that is an acoustic match with water. One problem in earlier embodiments was the failure of the meat wrapping material which sometimes failed as a result of exposure to either the shock wave or the gas bubble. Because the bag meat in earlier embodiments was in the same water that was exposed to the explosive discharge, in the case of bag failure some water would come in direct contact with the meat, and that water contained chemicals resulting from the explosion, possibly tainting the meat.

Use of a water impervious container 500 containing the meat and potable water in accordance with present invention solves this problem. For example, if a cylindrical container in which the meat is loaded is filled with potable water and sealed, the meat cannot come into contact with the water outside the container even if a meat packaging bag experienced a rupture. The same is true with respect to the continuous movement embodiments of FIGS. 2–4.

(3) Using a shock-wave reflective cylinder, especially with strips of explosive placed vertically against the inside wall of the cylinder as in FIGS. 5a–5f and 6a–6b, produces balanced forces of detonation. Shock waves, reflected inside the cylinder, produce hoop stress within the cylinder, but the forces are balanced and the cylinder does not move as a result of the explosion. The same effect is achieved by properly-placed electrodes, for example within cavities along the interior wall of the cylinder (not illustrated). The forces are similarly balanced in the embodiments of FIGS. 2–4.

The hydrodynamics of the present system produce shock waves that propagate from the shock-wave reflective cylinder wall and collide in the meat packed within the basket. This produces a pressure doubling, and on successive reflections produces a quasi hydrostatic pressure environment which lasts for more than 100 microseconds. Except in the special embodiment of FIG. 4, the interior wall of the shock-wave reflective cylinder must be spaced closely adjacent the basket to produce this effect since the wall acts as a reflector and contains the colliding shock waves.

The use of a water-impervious inner basket containing potable water along with the meat provides another advantage in that it allows the meat to be wrapped in a less expensive wrapping. If the shock wave generated by the explosion causes any tear or rupture in the plastic wrapping, the meat will not be harmed in any event because it is surrounded by potable water.

FIGS. 6a–6b show a related embodiment in which preferably the same cylinder 530 as is in the embodiment of FIGS. 5a–5f is used, but with trunnions 532 or the like and other minor modifications. The two open ends of the heavy-duty shock-wave reflective cylinder 530 again produce a balanced force so that the cylinder 530 does not move as a result of the explosion, because the gas bubble exhausts with equal force from both open ends of the cylinder.

The embodiment of FIGS. 6a and 6b uses a conveyor or track 650, shown schematically, for continuous or intermittent (semi-continuous) operation. The conveyor 650 may be, for example, a set of continuous belts running on rollers and having indentations for the trunnions 532 of the cylinder 530. The meat P is packed within the container 500 as in the other embodiment of FIGS. 5a–5f, centered within the steel cylinder 530.

FIGS. 6a and 6b show an elongated tank 400, preferably of ¾-inch (2 cm) thick stainless steel embedded in concrete. This elongated and simplified tank provides an improvement over the embodiment of FIGS. 5a–5d as illustrated, due to the high cost of the hemispherical tank and its supporting structure, which can weigh many tons. The tank 400 of FIGS. 6a–6b can be quite large, e.g. 14 ft. long, 8 ft. wide and 8 ft. deep. A bubble curtain may be placed around the sides of the tank 400.

The large size of the tank 400 tends to reduce the reaction of its walls to both the shock wave and the gas bubble. However, additional shock absorbing structures are desirably included. For example, beneath the location of the cylinder 530 at which the explosive discharge is to take place, a steel plate 672 is located at a distance of about 3 feet (0.9 m) from the bottom of the cylinder. This steel plate 672 is for example 6 ft (1.8 m) in diameter and 3 inches (8 cm) thick. The steel plate 672 is supported by springs 674, desirably Belleville springs, on the tank bottom. Dashpots 676 are also preferably provided, which act as shock absorbers to mitigate the downward force of the shock wave and gas bubble. The springs 674 return the plate to its previous position after deformation caused by the explosion.

The energy from the upwardly forced water is absorbed by a hood or explosion shield 671 located above the tank. The hood is desirably not attached to the tank itself because of the upward kinetic energy in the water, a result of the expanding gas bubble.

In operation, the container 500 filled with water and meat is placed into the heavy-duty cylinder 530 by arrangements such as those of FIGS. 5a–5f, probably with the use of a crane 632 due to the substantial weight involved. The cylinder 530 is engaged to the conveyor 650, which moves the cylinder 530 to the explosion position under the hood and below the water level. After explosive discharge, the cylinder 530 is moved again, preferably to the opposite end of the tank where it is removed by a crane 632. While this is occurring, another cylinder is lowered into the tank and moved into position for firing. (Alternately, the cylinder 530 is carried in a circular path so as to return to its starting point. Also, it can be arranged to obviate the need to stop at the firing point.)

With such a continuous or semi-continuous system, it is estimated that at least twice as much product can be tenderized in the same amount of time as with earlier embodiments in which the meat is placed along or closely adjacent the surface of the hemispherical tank.

Because the system FIGS. 6a–6b does not utilize the hemispherical-bottom tank illustrated in FIGS. 5a–5f, the cost of the system is substantially reduced.

In the following claims, an acoustic impedance of a conduit material is "similar" to the acoustic impedance of the surrounding liquid if a shock wave impinging on the conduit is refracted or reflected at the surfaces of the conduit to such a small extent that food products in liquid inside the conduit are subjected to a sufficient shock wave intensity, in spite of such refraction or reflection, to tenderize and/or sterilize the food product.

It is noted that the acoustic impedance of the conduit wall may be partly a function of wall thickness or structure (e.g. porosity). A shock wave may pass through a very thin layer of steel which would substantially reflect the shock wave if the steel were thicker. Thus materials having an acoustic impedance less closely matched to that of the liquids can be used in the present invention depending on geometry.

Because the speed of a shock wave can vary with intensity, and intensity can vary with distance from the shock wave generator (chemical charge or electrode), the present invention contemplates adjusting the path distance from the explosion to the conduit (including any reflections or refractions) to account for such variations. Also, when the invention employs refraction (i.e. acoustic lensing) to divert shock waves onto the conduit, the delay in transit time from the explosion to the conduit will take into account the different speed of the shock wave within the refractive medium. For example, an air-filled bladder inside a liquid can change the angle of a shock wave and by suitably shaping the bladder the shock wave can be refracted onto the conduit; but the shock wave will be slowed while in the air and arrive later than if it had passed through liquid.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

The terms "cylinder" and "generally cylindrical configuration" are not to be taken to specify a precise circular cylinder. Thus, the conduit or container, as well as the leavy-duty shock-wave reflective container or cylinder, can have for example an octagonal cross-section.

The expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. An apparatus for treating a food product, comprising:
   a heavy-duty and shock-wave resistant outer container of generally cylindrical configuration for containing a first liquid having a first liquid acoustic impedance, such outer container having a shock-wave reflective inner surface;
   a conduit or inner container for immersion in the first liquid and for containing a meat slurry or a second liquid containing meat pieces and having a second liquid acoustic impedance, the conduit or inner container having a conduit acoustic impedance similar to the first liquid acoustic impedance and to the second liquid acoustic impedance, whereby acoustic waves from said outer container are not substantially diverted by the conduit or inner container;
   the conduit or inner container being generally concentric with and spaced from the outer container with an annular space therebetween for the first liquid; and
   a multi-directional acoustic wave generator disposed outside the conduit or inner container and within and adjacent said outer container to impinge acoustic waves onto the conduit or inner container from more than one direction;
   whereby the meat slurry or meat pieces immersed in the second liquid, inside the conduit or inner container, may be treated by the acoustic waves passing therethrough, wherein the acoustic waves impinging from more than one direction produce a quasi-hydrostatic pressure rise inside the conduit or inner container, and wherein impulses of the acoustic waves are substantially balanced, whereby no substantial lateral net force is exerted on the conduit or inner container.

2. The apparatus according to claim 1, comprising a pump for pumping a mixture of the food product and the second liquid through the conduit.

3. The apparatus according to claim 1, wherein the acoustic wave generator comprises an electrode pair coupled to an electric discharge circuit and wherein the discharge circuit continuously repeatedly discharges to create explosions at the electrode pair at a rate such that all of the food product passing along the conduit is treated by shock waves from the wave generator.

4. The apparatus of claim 3, wherein said electrode pairs are each disposed in a generally parabolic shaped bowl at approximately the focal point of said bowl, said bowls being formed of shock-reflective material and forming a part of said outer container.

5. The apparatus of claim 1 wherein said outer container comprises thick-walled stainless steel.

6. An apparatus for treating a food product, comprising:
   an outer container of generally cylindrical configuration for containing a first liquid having a first liquid acoustic impedance, such outer container having a shock-wave reflective inner surface;
   a conduit or inner container for immersion in the first liquid and for containing a meat slurry or a second liquid containing meat pieces and having a second liquid acoustic impedance, the conduit or inner container having a conduit acoustic impedance similar to the first liquid acoustic impedance and to the second liquid acoustic impedance, whereby acoustic waves from said outer container are not substantially diverted by the conduit or inner container;
   the conduit or inner container being generally concentric with and spaced from the outer container with an annular space therebetween for the first liquid; and
   a multi-directional acoustic wave generator disposed outside the conduit or inner container and within and adjacent said outer container to impinge acoustic waves onto the conduit or inner container from more than one direction;
   whereby the meat slurry or meat pieces immersed in the second liquid, inside the conduit or inner container, may be treated by the acoustic waves passing therethrough, wherein the acoustic waves impinging from more than one direction produce a quasi-hydrostatic pressure rise inside the conduit or inner container, and wherein impulses of the acoustic waves are substantially balanced, whereby no substantial lateral net force is exerted on the conduit or inner container,
   wherein the acoustic wave generator includes a plurality of single shock wave sources spaced circumferentially about said outer cylinder at substantially equal distances apart.

7. The apparatus according to claim 6, wherein the shock wave sources are spaced at substantially equal distances from the conduit or inner container and explosions at the sources are substantially simultaneous.

8. An apparatus for treating a food product, comprising:
   an outer container of generally cylindrical configuration for containing a first liquid having a first liquid acoustic impedance, such outer container having a shock-wave reflective inner surface;
   a conduit or inner container for immersion in the first liquid and for containing a meat slurry or a second liquid containing meat pieces and having a second liquid acoustic impedance, the conduit or inner container having a conduit acoustic impedance similar to the first liquid acoustic impedance and to the second liquid acoustic impedance, whereby acoustic waves from said outer container are not substantially diverted by the conduit or inner container;

the conduit or inner container being generally concentric with and spaced from the outer container with an annular space therebetween for the first liquid; and a multi-directional acoustic wave generator disposed outside the conduit or inner container and within and adjacent said outer container to impinge acoustic waves onto the conduit or inner container from more than one direction;

whereby the meat slurry or meat pieces immersed in the second liquid, inside the conduit or inner container, may be treated by the acoustic waves passing therethrough, wherein the acoustic waves impinging from more than one direction produce a quasi-hydrostatic pressure rise inside the conduit or inner container, and wherein impulses of the acoustic waves are substantially balanced, whereby no substantial lateral net force is exerted on the conduit or inner container, while in use containing said first liquid and said second liquid and meat within said second liquid in the form of hamburger or meat pieces in said second liquid.

9. An apparatus for treating a food product, comprising:

an outer container of generally cylindrical configuration for containing a first liquid having a first liquid acoustic impedance, said outer container having a shock-wave reflective inner surface;

an inner container for immersion in the first liquid and for containing meat or a second liquid containing meat pieces, wherein said second liquid has a second liquid acoustic impedance, the inner container having a conduit acoustic impedance similar to the first liquid acoustic impedance and the second liquid acoustic impedance, whereby acoustic waves reflected from said shock-wave reflective inner surface of said outer container are not substantially diverted by the inner container;

the inner container being generally concentric with and spaced from the outer container with an annular space therebetween for the first liquid, said inner container having a circular cylindrical side wall, a first end wall and a lid opposite said first end wall; and at least one acoustic wave generator positioned so as to impinge acoustic waves on meat within said inner container, and whereby said acoustic waves reflect from said shock-wave reflective inner surface of said outer container;

whereby the meat or meat pieces immersed in the second liquid, inside the inner container, may be treated by acoustic waves passing therethrough and a quasi-hydrostatic pressure rise inside the inner container is produced whereby no substantial lateral net force is exerted on the inner container.

10. The apparatus of claim 9 in use, wherein said first liquid is present and is water, and said container is filled with pieces of meat with said second liquid filling the voids between said pieces of meat.

11. The apparatus of claim 9, wherein said acoustic wave generator comprises a series of chemical explosives, optionally in strip form, disposed circumferentially equidistantly along said inner surface of said outer container.

12. The apparatus of claim 11, wherein said chemical explosive is in strip form extending substantially the length of said outer container, and wherein at least four said strips of explosive are disposed at 90° from one another.

13. The apparatus of claim 9 further comprising a conveyor for moving said cylinder and said container from a meat loading zone to a zone where said meat treating is carried out by impinging said acoustic waves, and then to a meat unloading zone.

14. The apparatus of claim 9, wherein said first liquid and said second liquid are the same liquid.

15. The apparatus of claim 9, wherein said inner container provides a barrier between said first liquid and said second liquid.

16. The apparatus of claim 15, wherein said first liquid and said second liquid are both water.

17. The apparatus of claim 9, wherein said acoustic wave generator comprises at least one strip of chemical explosive.

18. An apparatus for treating a food product, comprising:

an acoustic wave reflector having an axis and an inner surface substantially surrounding the axis, the inner surface including in a cross section thereof a generally circular cylinder;

a first liquid having a first liquid acoustic impedance disposed within the reflector;

an acoustic wave generator disposed within the wave reflector and immersed in the first liquid;

a food product container disposable inside the wave reflector, the food product container having therein a second liquid;

whereby the food product inside the container may be treated by acoustic waves, created by the wave generator and reflected by the wave reflector, passing through the food product.

19. The apparatus according to claim 18, wherein the acoustic wave generator is elongated and disposed generally parallel to the axis.

20. The apparatus according to claim 18, wherein the container has a container acoustic impedance similar to the first liquid acoustic impedance and to the second liquid acoustic impedance, whereby acoustic waves are not substantially diverted within the wave reflector.

21. The apparatus according to claim 18, wherein the container is closed.

22. The apparatus according to claim 18, wherein the first liquid is substantially the same as the second liquid.

23. The apparatus according to claim 18, wherein the acoustic wave generator comprises at least one elongated chemical explosive.

24. The apparatus of claim 23, wherein the first liquid and the second liquid are the same and comprise water.

25. The apparatus of claim 18, wherein said container provides a barrier between said-first liquid and said second liquid.

26. A method for treating a food product, comprising:

providing a first liquid having a first liquid acoustic impedance within a generally cylindrical and heavy-duty shock-wave resistant container having a shock-wave reflective inner surface;

providing a conduit or inner container immersed in the first liquid and containing a second liquid having a second liquid acoustic impedance, the conduit or inner container having an acoustic impedance similar to the first liquid acoustic impedance and to the second liquid acoustic impedance, whereby acoustic waves are not substantially diverted by the conduit or inner container; and impinging acoustic waves onto the conduit or inner container from more than one direction from multi-directional acoustic wave generator disposed outside the conduit or container;

whereby the food product may be immersed in the second liquid inside the conduit or inner container and treated by the acoustic waves passing therethrough.

27. The method according to claim 26, wherein the step of impinging acoustic waves onto the conduit from more than one direction includes impinging the waves on the conduit generally simultaneously.

28. A method for treating meat for at least one of tenderization and killing microorganisms, comprising:

provided a first liquid having a first liquid acoustic impedance within a generally cylindrical and heavy-duty shock-wave resistant container having a shock-wave reflective inner surface;

providing a conduit or second container immersed in the first liquid and containing a second liquid having a second liquid acoustic impedance, the conduit or second container having an acoustic impedance similar to the first liquid acoustic impedance and to the second liquid acoustic impedance, whereby acoustic waves are not substantially diverted by the conduit or second container;

providing meat to be treated within said conduit or second container;

providing at least one acoustic wave generator so positioned as to impinge acoustic waves onto the meat to be treated within said conduit or second container; and impinging acoustic waves onto the meat within said conduit or second container whereby the meat therewithin is treated by the acoustic waves passing therethrough.

\* \* \* \* \*